(12) United States Patent
Dalton et al.

(10) Patent No.: US 6,236,653 B1
(45) Date of Patent: May 22, 2001

(54) LOCAL TELEPHONE SERVICE OVER A CABLE NETWORK USING PACKET VOICE

(75) Inventors: Robert William Dalton, North Andover, MA (US); Martin Joel Glapa, Golden, CO (US); Krishna Gudapati, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/772,711

(22) Filed: Dec. 23, 1996

(51) Int. Cl.[7] .................................................. H04L 12/64
(52) U.S. Cl. ........................................... 370/352; 370/389
(58) Field of Search ................................... 370/466, 467, 370/352, 353, 354, 355, 356, 395, 465, 252, 389

(56) References Cited

U.S. PATENT DOCUMENTS

| | | | |
|---|---|---|---|
| 5,341,374 | * | 8/1994 | Lewen et al. . |
| 5,604,737 | * | 2/1997 | Iwami et al. ......................... 370/352 |
| 5,719,872 | * | 2/1998 | Dubberly et al. .................... 370/487 |
| 5,926,479 | * | 7/1999 | Baran ................................... 370/395 |
| 6,028,860 | * | 2/2000 | Laubach et al. ..................... 370/395 |

OTHER PUBLICATIONS

Patent No. 5528582, filed on Jul. 29, 1994 and issued on Jun. 18, 1996 to George E. Bodeep, Thomas E. Darice, and Xiaolin Lu.

Patent No. 5583927, filed on May 1, 1995 and issued on Dec. 10, 1996 to Thomas C. Ely and Darek A. Smyk.

Patent No. 5432785, filed on Feb. 7, 1994 and issued on Jul. 11, 1995 to Masuma Ahmed and Stephen M. Walters.

AT&T Hybrid Fiber/Coax, System Architecture, Sep. 1994, Issue 1.0.4, Sects. 1–4.

* cited by examiner

*Primary Examiner*—Huy D. Vu
(74) *Attorney, Agent, or Firm*—Joseph J. Opalach

(57) ABSTRACT

A cable modem supports two-way packet-switched traffic and is capable of telephony-type signaling to provide local telephone services over a two-way HFC cable network. The telephony-type signaling is transmitted using the TCP/IP protocol over an HFC distribution plant. This telephony-type signaling includes representations of "off-hook," "on-hook," etc. At the customer's premises, the telephony cable modem takes any one of a number of forms. For example, the telephony cable modem comprises terminal equipment ports for coupling to both data terminal equipment such as a personal computer and voice terminal equipment such as a POTS telephone. Alternatively, the telephony cable modem includes POTS functionality and comprises a handset and keypad for dialing. As yet another example, the telephony cable modem includes a terminal equipment port for coupling to data terminal equipment that also functions as a telephone, such as a personal computer equipped with a microphone and speakers.

9 Claims, 8 Drawing Sheets

FIG. 3
TCP/IP TELEPHONE SIGNALING
(PORTION OF IP MESSAGE)
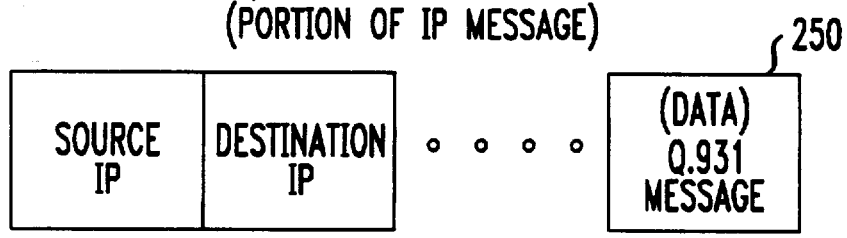
FIG. 4
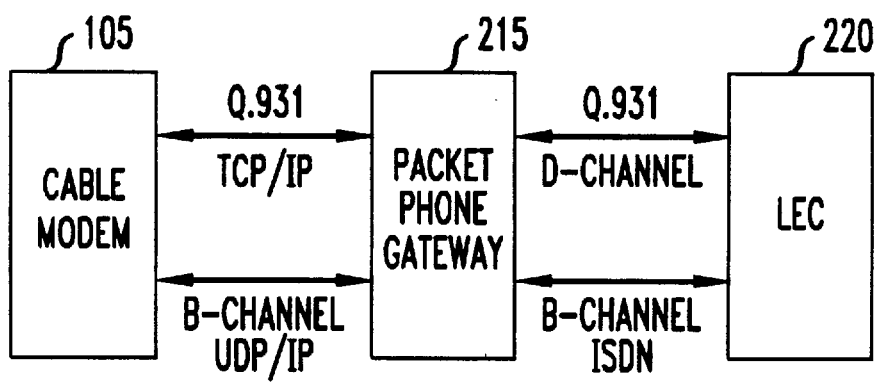
FIG. 5
| SUBSCRIBER IP ADDRESS | (DN) TELEPHONE NUMBER | GATEWAY IP ADDRESS |
|---|---|---|
| 199.222.104.150 | 1-908-949-8818 | 199.222.104.160 |
| 199.222.104.151 | 1-908-949-7640 | 199.222.104.161 |
| 199.222.104.152 | 1-908-949-1708 | 199.222.104.162 |

PSTN INTERWORKING
CONTROL-PLANE PROTOCOL EXAMPLE

PSTN INTERWORKING
USER-PLANE PROTOCOL EXAMPLE

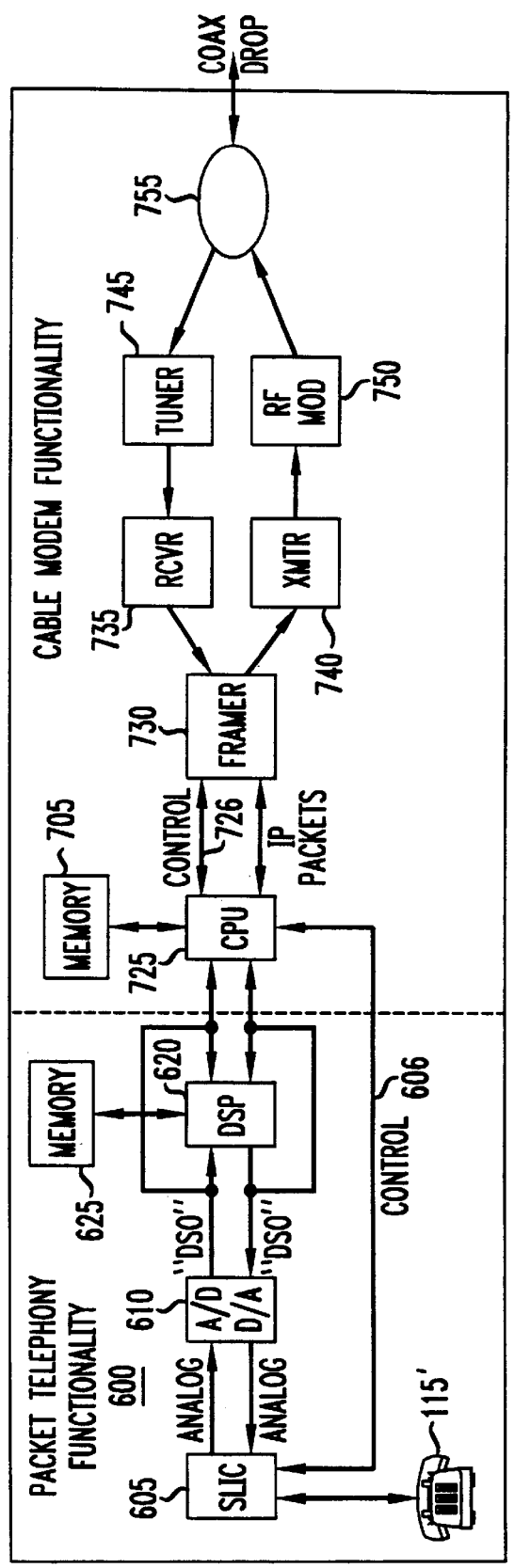

LOCAL TELEPHONE SERVICE OVER A CABLE NETWORK USING PACKET VOICE

BACKGROUND OF THE INVENTION

The present invention relates to communications equipment, and, more particularly, to telephony-type services.

Today, it could be argued that providing Internet service is the fastest growing market in the United States and around the world. For most people, access to the Internet is provided via a "plain-old-telephone service" (POTS) connection to an "Internet service provider" (ISP). In this instance, one simply has to incorporate an analog modem into a personal computer, or equivalent, and have a customer account with the ISP. As such, at one level, accessing the Internet this way is as simple as dialing a telephone number associated with the ISP and "logging in." However, at another level, this type of Internet connection comprises disparately different parts.

For example, the POTS connection to the ISP is a PSTN "circuit-switched" "data call." However, at the ISP the Internet call becomes "packet-switched" as known in the art. In addition, the customer's analog modem is coupled to the "local-loop" plant of the local exchange carrier (LEC) of the public-switched-telephone-network (PSTN). This local-loop is typically a pair of wires, conventionally referred to as "tip/ring." Unfortunately, local-loop access has a basic limitation—namely bandwidth. Currently, analog modems only offer limited raw data rates, e.g., in the neighborhood of 33 kbps (thousands of bits per second). Since Internet applications typically require large amounts of data, e.g., for pictures, etc., and may also involve voice (audio) communications, accessing the Internet via a circuit-switched local-loop has performance problems.

In an attempt to improve performance, the industry is continuing to push data rates on the local-loop higher and higher as evidenced by the recently announced 56 kbps technology from such companies as Lucent Technologies Inc. and U.S. Robotics. Further, the industry is continuing to develop data compression schemes for audio communications such as ITU-T standards G.729, G.729 Annex A, or G.723. These compression schemes effectively decrease data rates needed to support audio transmission in "real-time" despite the low bandwidth of the local loop and any inherent delays in packet switching caused by the Internet. (It should be noted that the low bandwidth of the local-loop accentuates any such packet-switched delays.)

Nevertheless, the limitations of the local-loop for Internet access have created an opportunity for cable modem manufacturers to provide Internet access via a cable modem. As such, cable modem manufacturers are beginning to leverage off of the hybrid-fiber-coax (HFC) distribution plant that exists for cable-TV, to provide two-way cable modems capable of accessing the Internet at significantly higher data rates. In such an architecture, high-speed communications exists for both voice and data to the Internet.

As such, the deployment of an HFC plant with two-way cable modems is an alternative Internet access means for both voice and data. Unfortunately, we have realized that such an approach does not replace the local-loop for basic telephony service. For example, a LEC cannot direct a POTS voice telephone call to a cable modem endpoint. Indeed, consumers now have two different communications systems at their doorsteps. One—an HFC plant with two-way cable modems—is designed for packet-switched data connectivity to the Internet. The other—the local-loop—provides telephone service.

SUMMARY OF THE INVENTION

Therefore, and in accordance with the inventive concept, we have designed a packet-switched two-way cable modem that supports basic telephony-type signaling. As a result, the inventive concept provides the basis for a communications system comprising an HFC plant with two-way cable modems that provides telephony services, thereby eliminating the need for a local-loop connection. As used herein, this two-way cable modem that supports telephone services is referred to as a "telephony cable modem."

In an embodiment of the invention, a telephony cable modem supports two-way packet-switched traffic and is capable of telephony-type signaling using the "transmission control protocol/Internet protocol" (TCP/IP), via an HFC distribution plant. This telephony-type signaling includes representations of "off-hook," "on-hook," etc.

At the customer's premises, the telephony cable modem takes any one of a number of forms. For example, the telephony cable modem comprises terminal equipment ports for coupling to both data terminal equipment such as a personal computer and voice terminal equipment such as a POTS telephone. Alternatively, the telephony cable modem includes POTS functionality and comprises a handset and keypad for dialing. As yet another example, the telephony cable modem includes a terminal equipment port for coupling to data terminal equipment that also functions as a telephone, such as a personal computer equipped with a microphone and speakers.

As a result of the above, the inventive concept provides local telephone service via cable access.

BRIEF DESCRIPTION OF THE DRAWING

FIG. 3 is an illustration of a portion of a telephony-type signaling conveyed in a TCP/IP message in accordance with the principles of the invention;

FIG. 4 shows the telephony signaling path in accordance with the principles of the invention;

FIG. 5 is an illustrative routing table for use in the communications system of FIG. 1;

FIG. 10 is another illustrative block diagram of a cable modem embodying the principles of the invention.

DETAILED DESCRIPTION

Figure 1:
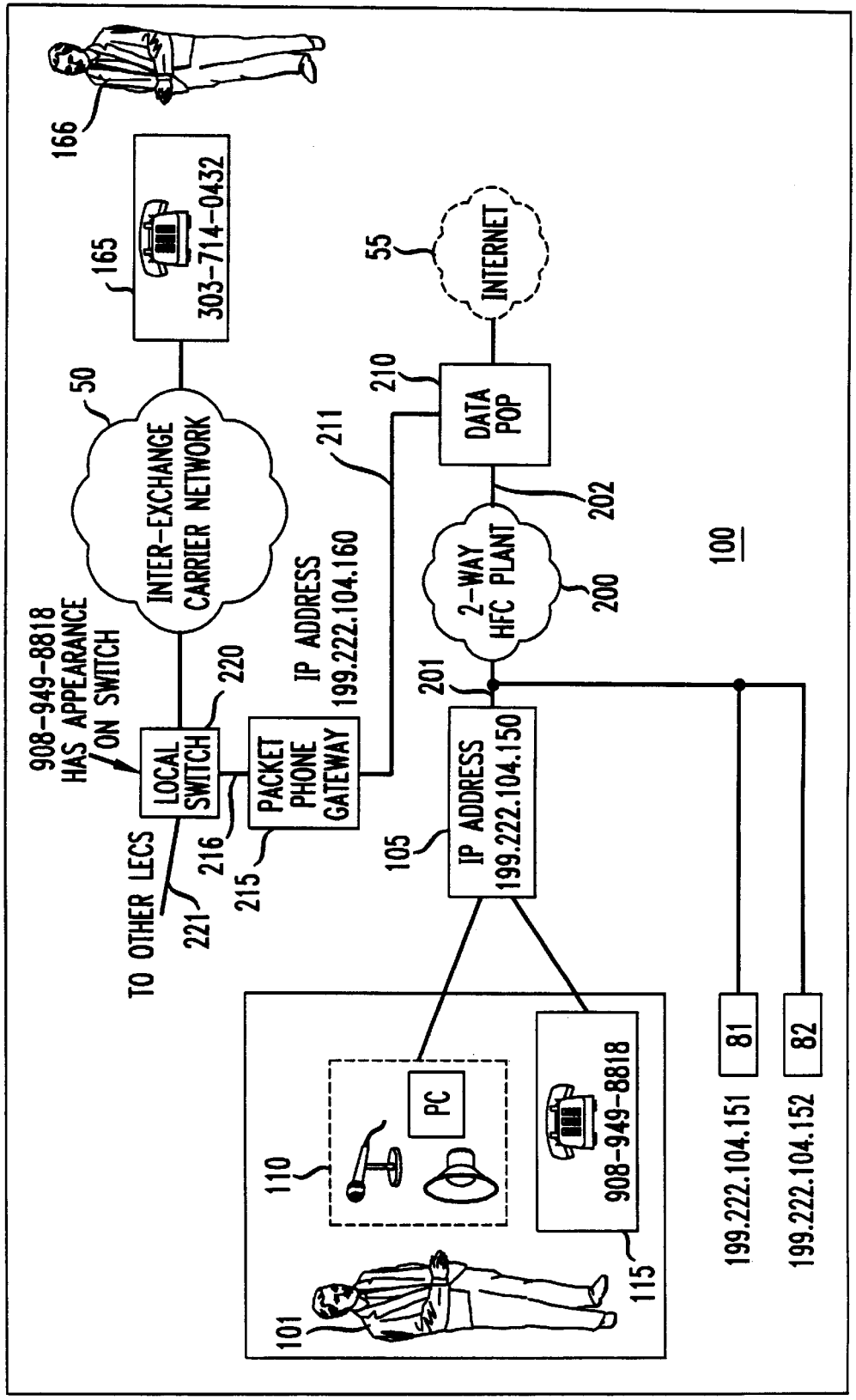
FIG. 1 is an illustrative block diagram of a communications system embodying the principles of the invention.

An illustrative high-level block diagram of a communications system embodying the principles of the invention is shown in FIG. 1. Other than the inventive concept, the elements of FIG. 1 are well-known and will not be described in detail. Communications systems 10 comprises customer premises equipment 100, 2-way HFC plant 200 (referred to herein as HFC 200), data point-of-presence (POP) 210, Internet 55, packet phone gateway 215, local switch 220, inter-exchange carrier network 50, and far-end customer premises equipment 165. Also shown on FIG. 1 are other cable drops as represented by cable modems 81 and 82, which are also assumed to embody the inventive concept.

Customer premises equipment 100 comprises data terminal equipment 110, telephone 115, and cable modem 105. Data terminal equipment 110 is illustratively a personal-computer equipped with a speaker and microphone for audio communications as known in the art along with the necessary hardware and software (not shown). Telephone 115 is illustratively a POTS telephone. Both Data terminal equipment 110 and telephone 115 are coupled to cable modem 105 (described below). The latter is coupled to HFC plant 200 via coaxial cable 201. Telephone 115 is identified by a telephone "directory number" (DN), e.g., 908-949-8818, and cable modem 105 has an associated "Internet Protocol" (IP) address, e.g., 199.222.104.150. A user of customer premises equipment 100 is identified herein by user 101.

The HFC plant 200 is representative of a 2-way, i.e., bi-directional transmission, cable network over a hybrid-fiber-coaxial cable distribution plant. This HFC distribution plant is terminated at the service provider's data POP 210, which is representative of equipment for switching packet data traffic. The data POP 210 is coupled to Internet 55 and packet phone gateway 215. Internet 55 illustratively represents the collection of facilities and networks that are called the Internet. (It should be noted that alternatively "intranets," or a combination of Internet/intranet networks, could be used).

As noted above, data POP 210 is coupled to packet phone gateway 215. The latter provides for the interface between a packet-switched environment and a circuit-switched environment in accordance with the principles of the invention (described below). The former environment being represented by HFC plant 200, data POP 210, and Internet 55; while the latter environment is represented by the PSTN as represented by local switch 220 and inter-exchange carrier network 50. Packet phone gateway 215 is coupled to the PSTN environment via an Integrated Services Digital Network (ISDN) interface 216, such as a basic rate interface (BRI), a primary rate interface (PRI), or others.

The PSTN environment is represented by local switch 220 and inter-exchange carrier network 50. As such, local switch 220 is also coupled to other LECs (not shown), via facilities 221, and to inter-exchange carrier network 50. The latter provides communications with customer premises equipment 165, which is illustratively a POTS telephone coupled to inter-exchange carrier network 50 through an associated LEC (not shown). User 166 is associated with customer premises equipment 165, which is associated with a DN, or telephone number, of 303-714-0432. (It should be noted that although shown separately, local switch 220 represents circuit-switching equipment. As such, physically, the functions of packet phone gateway 215 could be incorporated into the local switch.)

Figure 2:
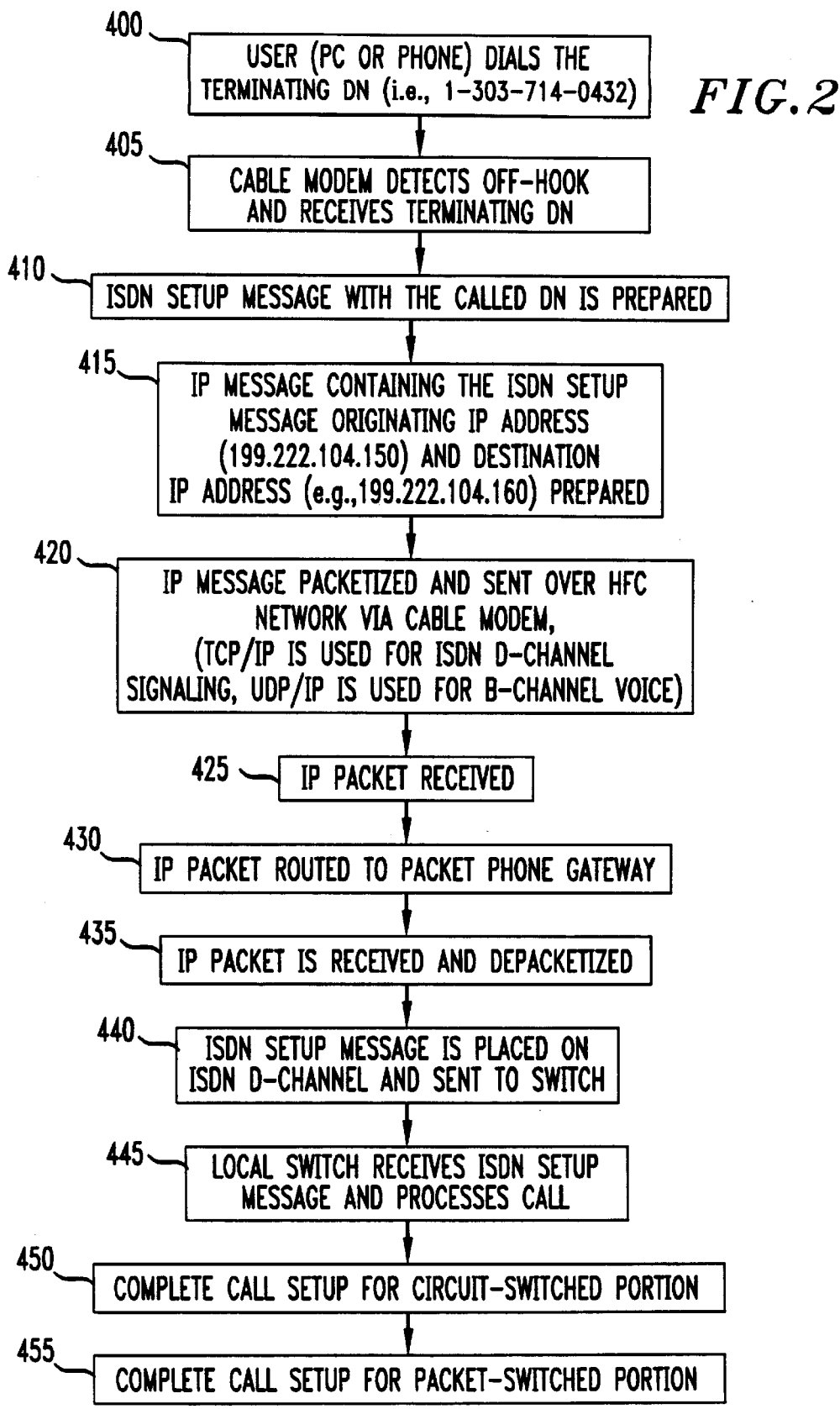
FIG. 2 is an illustrative flow diagram of a method embodying the principles of the invention.

At this point, in order to facilitate understanding the inventive concept, reference should be made to FIG. 2, which represents an illustrative method used herein to process a communications call between user 101 and user 166. In this example, the communications call is a voice call, and it is assumed that user 101 is the calling party and user 166 is the called party. In step 400, user 101 dials a telephone number associated with the called party, user 166, as known in the art, e.g., lifting the handset, etc., of telephone 115. As used herein the called party telephone number, 303-714-0432, is also referred to as the "terminating DN." In step 405, cable modem 105 (subsequent to detecting telephone 115 going "off-hook") receives, from telephone 115, the sequence of touch-tone digits representing the terminating DN. In step 410, and in accordance with the inventive concept, cable modem 105 formats an ISDN Setup message comprising the terminating DN. (In the prior art, ISDN equipment communicates signaling via an ISDN D-channel using the well known Q.931 standard. Although this illustrative embodiment of the inventive concept uses an ISDN Setup message in the context of cable modems and the IP protocol, it should be realized by those skilled in the art that other equivalent signaling messages may be defined. Indeed, other types of packet-type formats can be used like the asynchronous transfer mode (ATM).) In step 415, cable modem 105 formats an IP message for conveying ISDN D-channel signaling, with the originating, or source, IP address (199.222.104.150), and the destination IP address (e.g., 199.222.104.160). An illustrative IP message 250 is shown in FIG. 3. In this example, the above-mentioned ISDN Setup message is carried in the data portion of the IP message 250. In step 420, this IP message is transmitted by cable modem 105 and sent over HFC 200 using TCP/IP.

The data POP 210 receives the IP message in step 425. In step 430, data POP 210 routes the IP packet to packet phone gateway 215, as a function of the destination IP address, which in this example represents packet phone gateway 215. Upon receipt, Packet phone gateway 215 recovers the ISDN Setup message from the received IP packet in step 435. Packet phone gateway 215 retransmits the ISDN Setup message to local switch 220, via the D-channel of ISDN interface 216, in step 440. In step 445, local switch 220 receives the ISDN Setup message and processes the call as in the prior art, e.g., eventually causing a ringing signal to appear at telephone set 165.

As illustrated by the above description, and as shown in FIG. 4, packet phone gateway 215 communicates ISDN signaling information between local switch 220 and cable modem 105 in accordance with the principles of the invention. Although not shown, packet phone gateway 215 includes ISDN interface equipment to support ISDN interface 216 and IP packet equipment to support IP interface 211. As such, call signaling information, equivalent to states such as "setup," "ringing," "answer," "disconnect." etc. is communicated between local switch 220 and packet phone gateway 215 as ISDN signaling information via a D-channel of ISDN interface 216, and as part of a TCP/IP message between packet phone gateway 215 and cable modem 105. For example, upon far-end customer premises equipment 165 going "off-hook" to answer the call, ISDN signaling message(s) are transmitted back to packet phone gateway 215 to complete a circuit-switched connection between packet phone gateway 215 and customer premises equipment 165 in step 450. In step 455, packet phone gateway 215 conveys this telephony-type signaling information to cable modem 105, via data POP 210 and HFC 200, to complete the packet-switched connection between packet phone gateway 215 and cable modem 105.

In order to facilitate call processing, the packet phone gateway 215 maintains a data structure or routing table as shown in FIG. 5. This routing table associates three fields for each subscriber: subscriber IP address, subscriber telephone number, and associated packet phone gateway address. This illustrative routing table shows information for three different subscribers with cable modems 105, 81, and 82, respectively (shown in FIG. 1). As can be observed from the routing table of FIG. 5, packet phone gateway 215 is associated with a plurality of IP addresses, one for each subscriber. For example, the IP address of cable modem 105 and telephone number of user 101 are associated with an IP address for packet phone gateway 215 of 199.222.104.160. As such, when cable modem 105 of user 101 sends a telephony-type signaling message using TCP/IP, it sends that message to IP address 199.222.104.160 of packet phone gateway 215. Similarly, a telephony-type signaling message from cable modem 81 is conveyed via a TCP/IP message to IP address 199.222.104.161 of packet phone gateway 215. The source IP address of the TCP/IP message from a cable modem identifies the subscriber. However, packet phone gateway 215 additionally uses the destination IP address to receive messages from a specific subscriber. (It should be noted that a single IP address could be used instead for packet phone gateway 215, or, alternatively, different groups of subscribers could be assigned with different packet phone gateway IP addresses.)

Similarly, the routing table of FIG. 5 is used by packet phone gateway 215 to relay ISDN signaling from local switch 220 to the respective subscriber. For example, incoming ISDN signaling messages corresponding to DNs listed in the table of FIG. 5 are relayed by packet phone gateway 215 to the corresponding cable modem at the indicated IP address. Using the above example, when packet phone gateway 215 receives an incoming ISDN signaling message identifying DN 908-949-8818, packet phone gateway 215 translates the DN to the corresponding IP address for cable modem 105, and retransmits the ISDN signaling message in a TCP/IP message to IP address 199.222.104.150 (cable modem 105).

As such, telephony-type services are provided in a packet-switched environment. In support of such services, cable modem 105 (described further below), provides any of a number audio signals to user 101 to reflect call progress responsive to received telephony-type signaling messages as represented by the ISDN-TCP/IP signaling. For example, when an incoming call is being placed to user 101, cable modem 105 first receives the respective ISDN signaling message and in response thereto provides ringing to alert the user. (It should be noted that in accordance with ISDN practice, some audible signaling, such as ringing is generated by the customer premises equipment (here, in accordance with the inventive concept, cable modem 105). However, other types of signals that a user receives such as "called user busy" are carried as both call-control signaling in the D-channel as well as audible tones conveyed by the B-channel from the local switch. In this context, as described below, such B-channel signaling is conveyed by UDP/IP messages from packet phone gateway 215 to cable modem 105.)

Once the above-described telephone call between user 101 and user 166 is established, cable modem 105 samples and digitizes voice for transmission to the called party as known in the art. In this example, the "User Datagram Protocol" (UDP) is used to transmit voice packets to packet phone gateway 215 over the packet-switched portion of the connection. This UDP/IP method of sending voice packets over a packet-switched connection is well-known and minimizes packet-switched delays. (There is a trade-off in using UDP versus TCP, e.g., UDP does not guarantee error-free transmission and does not require receiver acknowledgment.) Upon receiving the packets containing audio information, packet phone gateway 215 depacketizes the audio and provides the audio digital bit stream to the prior assigned B-channel of ISDN interface 216 (determined during call setup). Similarly, in the reverse direction, packet phone gateway 215 packetizes the received audio digital bit stream for transmission to cable modem 105 via UDP/IP. Responding to the received UDP/IP messages, cable modem 105 depacketizes and converts received audio samples to an analog form for transmission to telephone 115.

Figure 6:
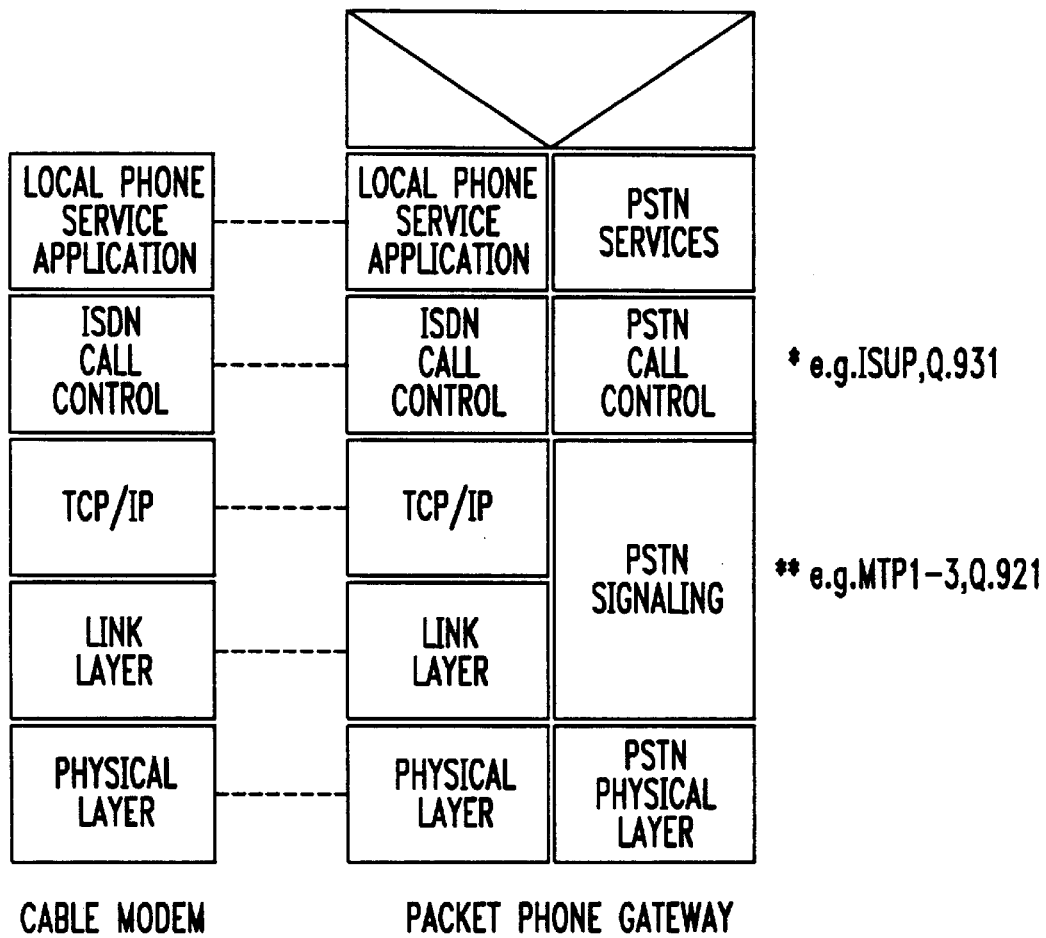
FIGS. 6 and 7 show illustrative protocol relationships in accordance with the principles of the invention.
Figure 7:
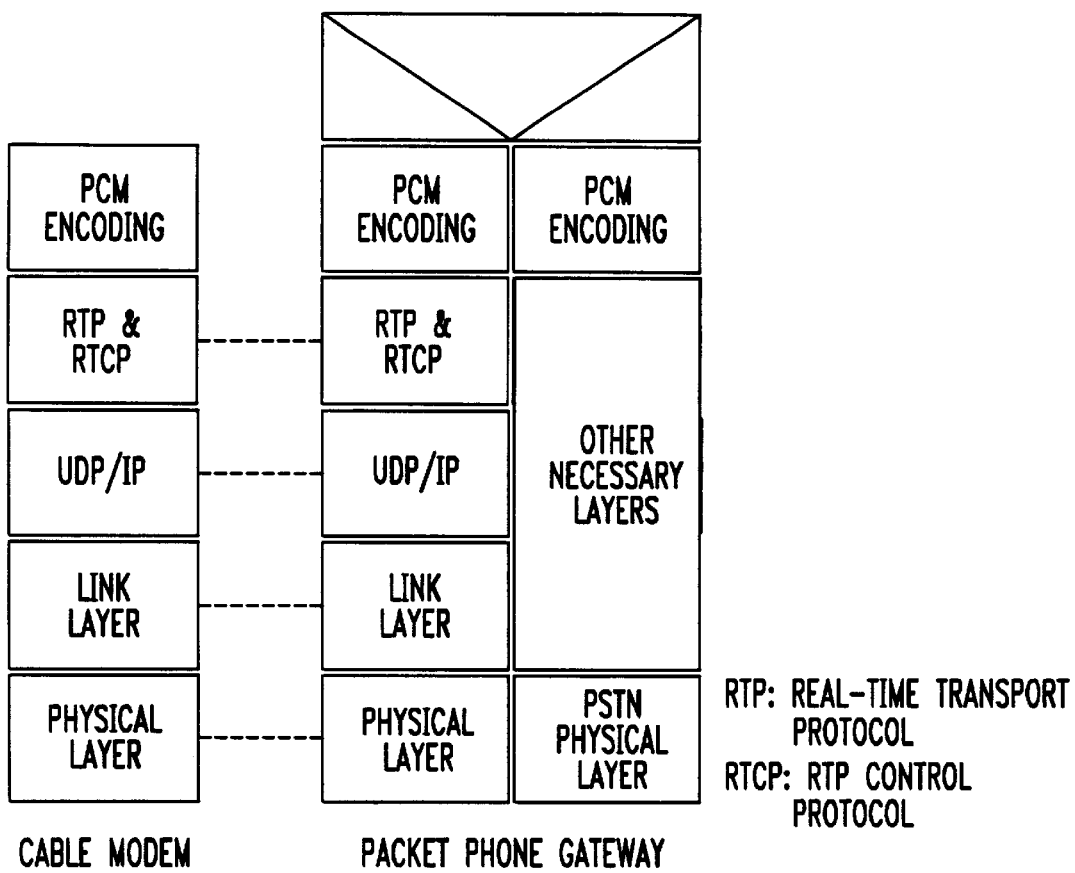

For reference purposes, FIGS. 6 and 7 show the protocol relationships between the packet-side and the PSTN-side for the control signaling (FIG. 6) and the user channel (FIG. 7). It should be noted in FIG. 6 that ISDN call control can use H.323 setup standards.

It should be noted that in the above description the telephone call uses packet transport between cable modem 105 and packet phone gateway 215, and circuit transport beyond. As 64 kbps of bandwidth is available for a voice call over a single ISDN B-channel no audio compression is necessary. However, voice calls to a packet-switched endpoint, e.g., off of Internet 55 of FIG. 1, may require compression. In this instance, cable modem 105 is modified in any number of fashions to activate compression/decompression functions as known in the art. For example, cable 105 can be administered by the user, e.g., via an equivalent "AT-type command" to use compression. Alternatively, cable modem 105 can adaptively use compression based, e.g., on the destination IP address.

Figure 8:
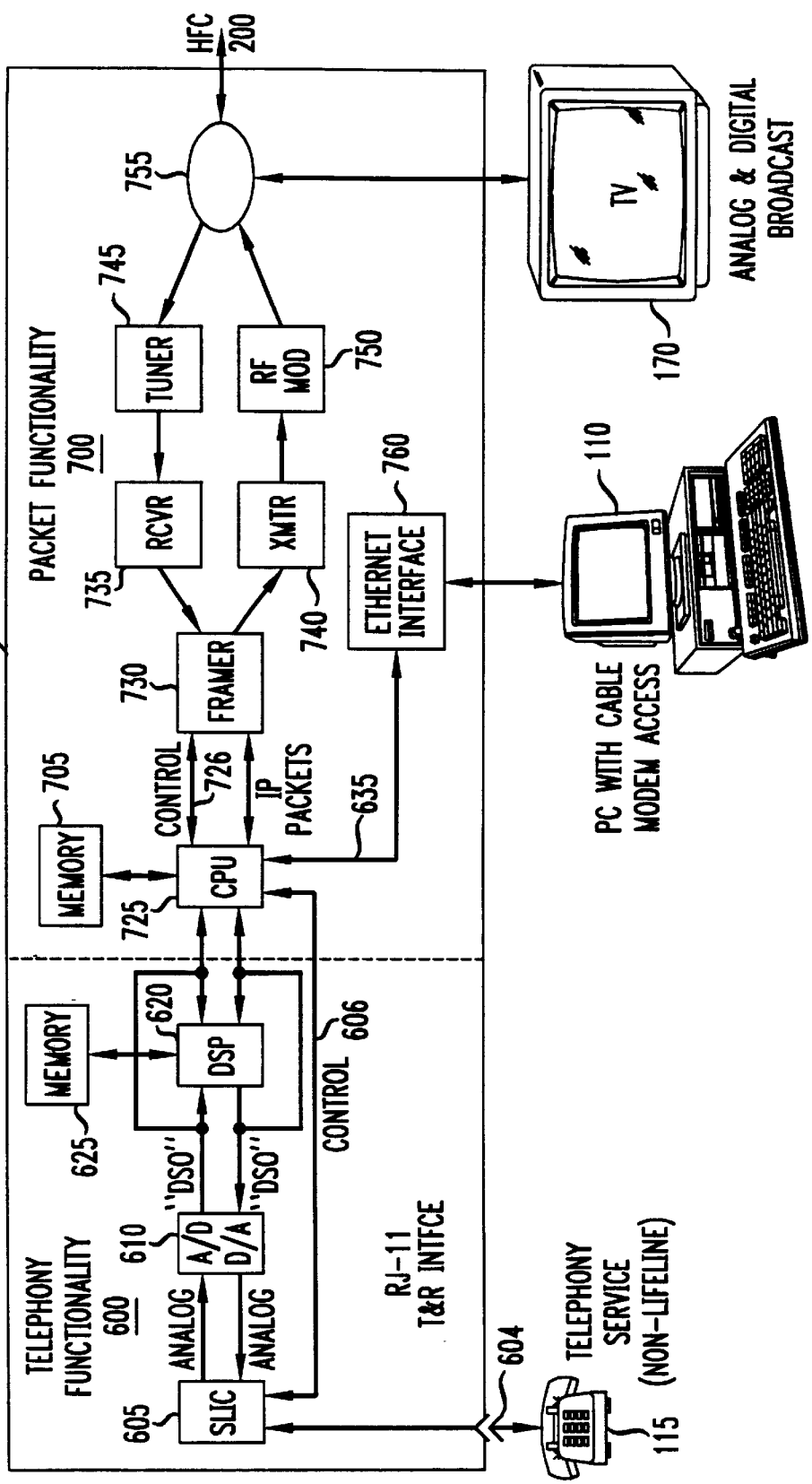
FIG. 8 is an illustrative block diagram of a cable modem embodying the principles of the invention.

An illustrative block diagram of a cable modem in accordance with the principles of the invention is shown in FIG. 8. Cable modem 105 comprises telephony portion 600 and packet portion 700. Although not shown, it is assumed cable modem 105 is powered locally (versus receiving power through HFC 200). (It should be noted that various safeguards can be taken for ensuring power to cable modem 105, e.g., via a power source with battery backup, etc.) As can be observed from FIG. 8, cable modem 105 couples to PC 110, telephone 115, and HFC 200. Also shown in FIG. 8 is a coupling to an analog or digital TV set (described briefly below).

Cable modem functionality portion 700 comprises memory 705, CPU 725, receiver 735, tuner 745, and splitter/combiner 755, and ethernet interface 760. Splitter/combiner 755 includes a "diplex filter" as known in the art. (It should be noted that, alternatively, splitter/combiner 755 can be external to cable modem 105.) CPU 725 is a stored-program-controlled central processing unit as known in the art, e.g., a microprocessor, coupled to memory 705, which provides both program storage and data storage. CPU 725 controls both the transmission, and reception, of packets to, and from, HFC 200 via splitter/combiner 755. In particular, in the transmitting direction, CPU 725 formats data into IP packets for application to framer 730, which "frames-up" the received data to generate a sequence of TCP/IP or UDP/IP frames to transmitter 740. The latter provides additional error correction/detection coding such as Reed-Solomon coding as known in the art and forms a modulated intermediate frequency (IF) carrier signal to radio frequency (RF) modulator 750, which develops the modulated-RF signal for transmission over HFC 200 (e.g., QPSK modulation as known in the art for upstream traffic). Similarly, in the receiving direction, a modulated RF signal is received from HFC 200, via splitter/combiner 755, for application to tuner 745. The latter recovers an RF-modulated signal at a predefined tuner frequency (e.g., QAM modulation as known in the art for downstream traffic). The recovered RF modulated signal is applied to receiver 735 which demodulates the recovered RF modulated signal and provides a sequence of received TCP/IP or UDP/IP frames to framer 730. The latter provides a stream of packets to CPU 725, which also controls framer 730 via signal 726 for the purpose of timing/synchronization and error detection. (Framer operation is known in the art, e.g., see "Digital Transmission Systems," second edition, by David R. Smith; Van Nostrand Reinhold, 1992.) Cable modem 105 terminates a cable signal—which is divided into different frequency bands, e.g., a broadcast video channel and a data channel (for packets). Splitter/combiner 755 provides any cable-TV signaling to TV 170 (it is assumed for the purposes of this example, that TV 170 includes any required cable TV decoding function).

CPU 725 forms packets from the digital audio information received from the telephony portion 600. CPU 725 also handles packets from ethernet interface 760, which transmits packets.

Ethernet interface 760 couples to data terminal equipment, or personal computer (PC), 110. The latter forms a multi-media endpoint. That is, PC 110 (as mentioned earlier) is suitably configured to support the transmission and reception of data and audio as might be required, e.g., in an audio conferencing application. As noted, PC 110 provides data and audio information in the form of packets.

Telephony portion 600 comprises memory 625, DSP 620, converter 610, and subscriber-line-interface-circuit (SLIC) 605. The heart of telephony portion 600 is DSP 620 and memory 625. DSP 620 is a stored-program-control digital signal processor as known in the art. Memory 625 provides both program storage and data storage for DSP 620. SLIC 605 provides the tip/ring interface to telephone 115. Converter 610 provides the interface between the digital world and the analog world, i.e., converter 610 is simply a pair of analog-to-digital and digital-to-analog converters. Telephony portion 600 provides a number of functions. First, a telephone network simulator function, via SLIC 605. That is, cable modem 105 "looks like" the local loop of a telephone network to telephone 115, via port 604. As a result, no modifications are required to be made to telephone 115 to work with the inventive concept. This telephone network simulator function provides a set of well-known telephone signaling functions like the ability to sense off-hook, provide loop current, provide dial tone, detect dialing (pulse or DTMF), etc. Since these functions and their implementation are well-known, they are not described in detail. SLIC 605 is controlled by CPU 725 via line 606. Consequently, as ISDN signaling messages are received by CPU 725, the latter decodes the ISDN signaling messages and controls SLIC 605 to convey the proper signaling back to telephone 115. For example, "ringing," etc. Similarly, in the other direction, SLIC 605 provides an "offhook" indication, dialed digits, etc., to CPU 725, via control 606. CPU 725 formats this information into ISDN signaling messages as appropriate.

Another function performed by telephony portion 600 is the PCM encoding and compression (if necessary) of audio signals. In the context of the above-described example, it was assumed that compression of an audio signal was not necessary. As a result, SLIC 640 coveys audio signals to, and receives audio signals from, CPU 725, via converter 610. The latter converts between the analog domain and the digital domain (the latter represented as a PCM encoded signal or "DS0"). However, if necessary, DSP 620 provides for compression and decompression of PCM encoded signals. In this case, SLIC 640 conveys audio signals to, and receives audio signals from, DSP 620, via converter 610. DSP 620 receives PCM encoded audio from converter 610. DSP 620 provides compressed digital audio to CPU 725. Similarly, in the reverse direction, DSP 620 receives a compressed audio digital bit stream from CPU 725, decompresses this signal, and provides PCM encoded audio to converter 610, which then provides analog audio to telephone 115, via SLIC 605. As noted above, DSP 620 can be enabled or disabled in any number of ways to provide for the compression/decompression of the PCM encoded signaling.

As can be observed from the above description, the inventive concept allows one to plug a regular telephone into cable modem 105 to make, and receive, voice calls over what is essentially a packet-switched network. This has additional human factors advantages. That is, most everyone knows how to use a plain old telephone set. Pick up the handset on telephone 115 and cable modem 105 provides dial-tone. Depress buttons on the dialing pad (not shown) of telephone 115, and cable modem 105 transmits an ISDN Setup message to packet phone gateway 215, where this ISDN Setup message includes the called party number. Upon answer, cable modem 105 converts between analog audio signals and digital audio signals, thus providing communication to the called party. Similarly, in the reverse direction, when cable modem 105 receives an ISDN Setup message, CPU 725 causes SLIC 605 to apply a "ringing signal" to telephone 115. Thus, voice communications in the opposite direction are achieved.

Figure 9:
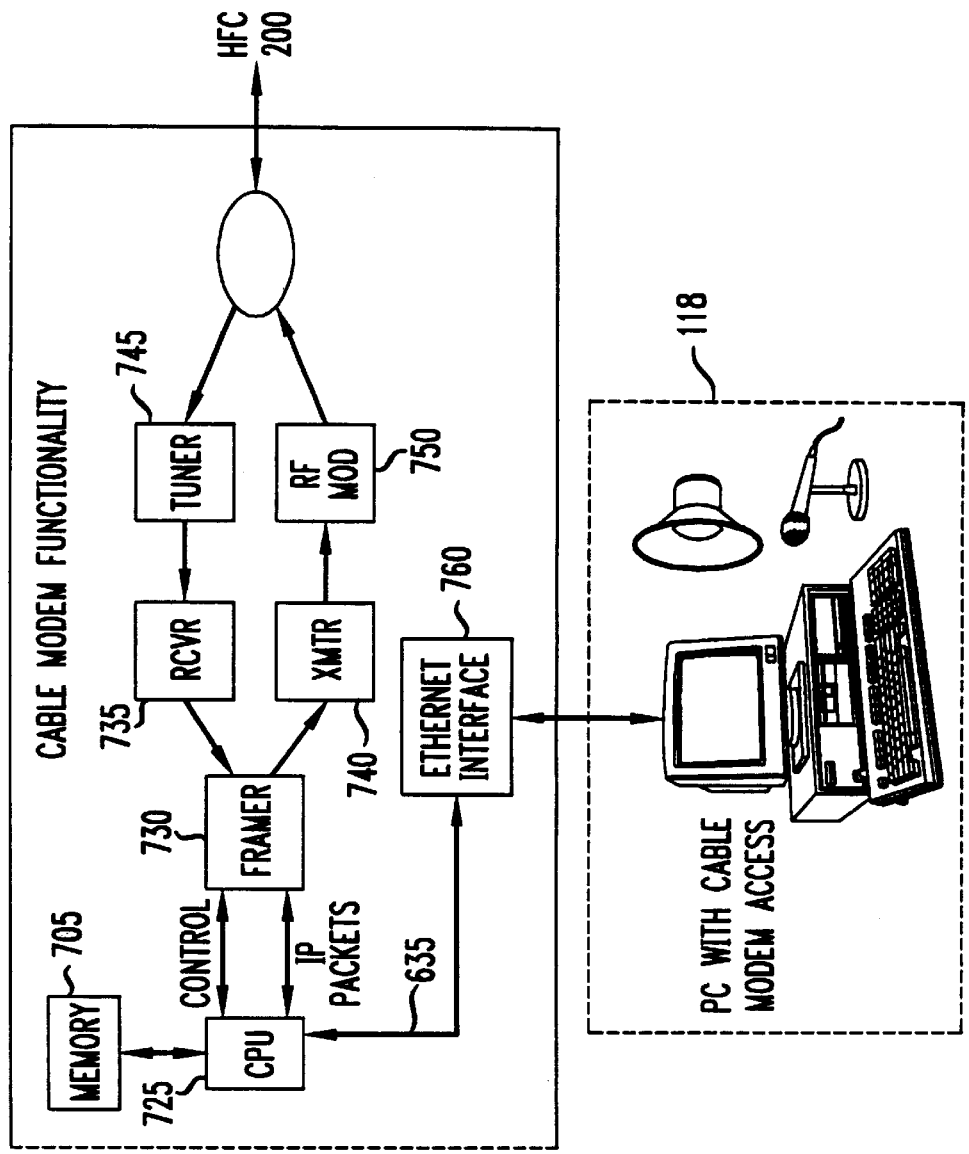
FIG. 9 is another illustrative block diagram of a cable modem embodying the principles of the invention.

Although FIG. 8 shows one illustrative form of a cable modem in accordance with the principles of the invention, a cable modem in accordance with the inventive concept can take on other forms as suggested by FIGS. 9 and 10. In these figures, the packet telephony function and the cable modem interface function are distributed in different fashions. FIG. 9 is illustrative of a cable modem that only works with data terminal equipment configured to provide audio communications in accordance with the principles of the invention. In this instance, incoming voice-only telephone calls from, e.g., user 166 cause cable modem 105 to provide an incoming call to PC 110, which either causes an alert (audible, such as a ringing signal, or visual) to be generated. (In this mode of operation, it is assumed that PC 110 is powered-on and available to receive incoming ethernet-type packets). In contrast, FIG. 10 is illustrative of a cable modem that provides an integrated form of telephone. In the simplest embodiment, functionality previously found in telephone 115 is now included within the cable modem as represented by telephone 115'. In other words, cable modem 105 has a dial pad, handset, etc. (not shown). In this application, the cable modem is utilized primarily as a POTS telephone coupled to a packet-switched environment. It should be realized by those skilled in the art that integrating the functionality of telephone 115 into the cable modem provides the opportunity to simplify the circuit design.

It should be noted that although physically different hardware configurations are shown in FIGS. 8, 9, and 10, the same software can be re-used between the three illustrative embodiments with suitable portions either eliminated, or via configuration settings disabled. For example, in the latter case, a set of "DIP" switches as known in the art identifies the customer configuration for CPU 725, e.g., no telephone connected, no data terminal connected etc. Such an approach can also be used to identify the default endpoint, e.g., all incoming calls from packet phone gateway 215 initially ring telephone 115. Alternatively such options can be set via a "command mode" similar in effect to that found in analog modems today.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although a "cable modem" was used to illustrate the inventive concept, it should be realized that the equivalent function of the inventive cable modem could be included within other equipment such as a personal computer, data appliance, etc.

What is claimed:

1. A method for use in equipment for providing telephone services over a cable network, the method comprising the steps of:

coupling the equipment to at least one packet facility and at least one switched facility;

receiving a telephone signaling message from a switched facility coupled thereto, the telephone signaling message comprising, at least, a called party telephone number;

identifying a packet address from the called party telephone number; and transmitting the telephone signaling message in a packet form over the packet facility to the identified packet address wherein the telephone service is Provided to a number of users and further comprising the step of storing a routing table, the routing table comprising three fields for each user: a user packet address, a telephone number and a packet address for the equipment such that for at least two users the equipment packet address is different.

2. The method of claim 1 wherein the transmitting step includes the step of using a transaction-control-protocol/Internet Protocol (TCP/IP) in transmitting the packet.

3. The method of claim 2 wherein the telephone signaling message is an ISDN signaling message.

4. A method for use in equipment for providing telephone services over a cable network to a number of users, the method comprising the steps of:

a) coupling the equipment to at least one packet facility and at least one switched facility;

b) communicating telephone signaling messages received over the switched facility in packet form over the packet facility and vice versa; and c) communicating data between the switched facility and the packet facility in support of any telephone calls established as a result of step a)

wherein step b) includes the step of storing a routing table, the routing table comprising three fields for each user: a user packet address, a telephone number and a packet address for the equipment such that for at least two users the equipment packet address is different.

5. The method of claim 4 wherein step b) includes the step of using a transaction-control-protocol/Internet Protocol (TCP/IP) for transmitting and receiving telephone signaling messages over the packet facility.

6. The method of claim 5 wherein the switched facility is an ISDN facility and the telephone signaling messages are ISDN signaling messages.

7. The method of claim 4 wherein step c) includes the step of using a user-datagram-protocol/Internet Protocol (UDP/IP) for transmitting and receiving the data over the packet facility.

8. The method of claim 7 wherein the switched facility is an ISDN facility comprising a D-channel and at least one B-channel, and the data corresponds to information communicated to, and from, the at least one B-channel.

9. The method of claim 8 wherein the data is audio information between a called party and a calling party.

* * * * *